Jan. 22, 1952 T. L. ANDERSON ET AL 2,583,075
LOG CARRIER
Filed Dec. 13, 1948 5 Sheets-Sheet 1

Theodore L. Anderson
Theodore H. Esbenshade
INVENTORS

*Theodore L. Anderson*
*Theodore H. Esbenshade*
INVENTORS

Theodore L. Anderson
Theodore H. Esbenshade
INVENTORS

Jan. 22, 1952  T. L. ANDERSON ET AL  2,583,075
LOG CARRIER
Filed Dec. 13, 1948  5 Sheets-Sheet 5
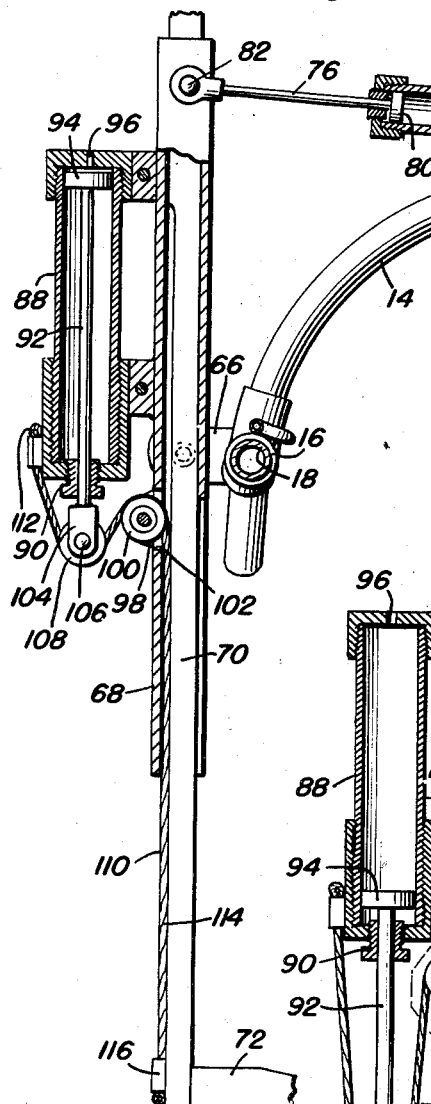
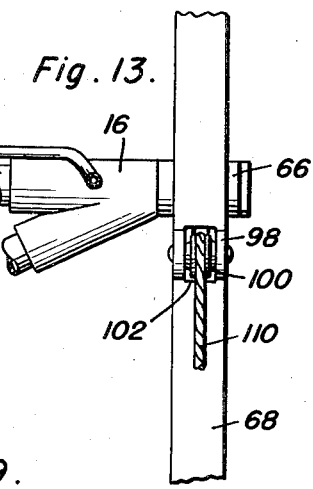
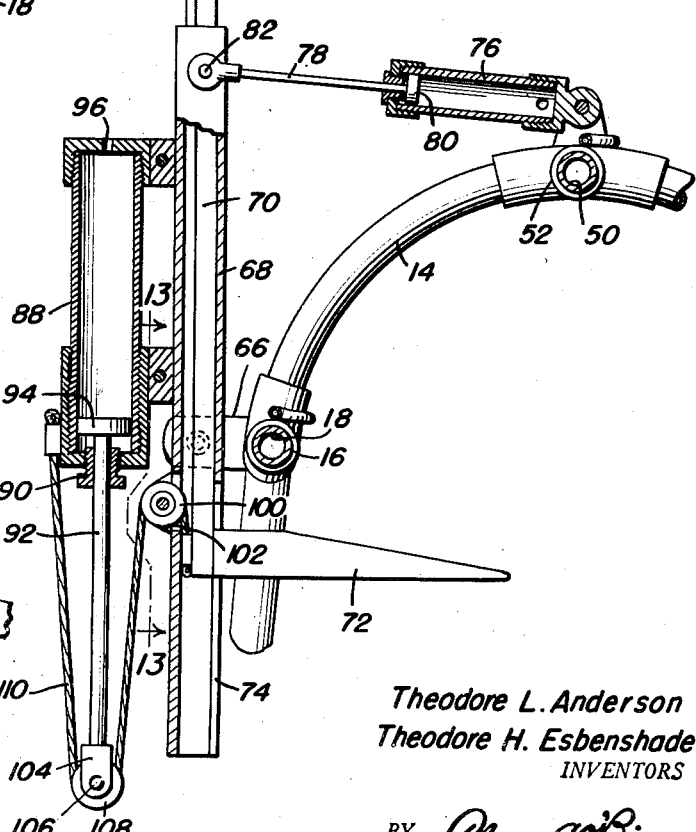
Theodore L. Anderson
Theodore H. Esbenshade
INVENTORS Patented Jan. 22, 1952

2,583,075

UNITED STATES PATENT OFFICE 2,583,075

LOG CARRIER

Theodore L. Anderson, Seal Rock, and Theodore H. Esbenshade, Newport, Oreg.

Application December 13, 1948, Serial No. 64,962

7 Claims. (Cl. 214—65.3)

This invention relates to new and useful improvements in hauling vehicles and the primary object of the present invention is to provide a wheeled frame for transporting or hauling logs between the tree falling area and a loading yard for trucks or flat cars, a sawmill pond, or a river or lake dumping dock.

Another important object of the present invention is to provide a log carrier adapted to replace the tractor logging "arch" and to serve in place of a truck under conditions in which it is not economical to employ the "arch" or grade and surface a road for trucks.

Another object of the present invention is to provide a tractor log carrier that will support logs above the ground as it conveys the same instead of dragging the said logs thus increasing the quantity of serviceable logs over the tractor logging "arch" method.

Another feature of the present invention is to provide a carrier that is so constructed as to permit the same to be utilized in yarding and loading logs for truck hauling. The usual yarding operation for tractor logging necessitates blading or winching logs into decks within reach of a derrick or "spar tree" and "donkey" so that the logs can be hoisted to the bed of a truck, usually one at a time. In using the present carrier, the logs may be piled for truck loads in any convenient part of the area. Each load can then be picked up by the carrier, brought over to the truck, and released as a complete load on the truck bed. Yarding with the present carrier thereby eliminates the hoisting equipment, equipment operators, and other loading personnel.

A further object of the present invention is to provide a log carrier including a wheeled frame, a plurality of pivotal members adapted for positioning under a pile of logs, and embodying novel and improved means for swinging said members under a pile of logs and for lifting the logs supported by the members.

A still further aim of the present invention is to provide a log carrier that is simple and practical in construction, strong and reliable in use, small and compact in structure, efficient and reliable in operation, neat and attractive in appearance, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 8 is an enlarged, fragmentary vertical sectional view taken substantially on the plane of section line 8—8 of Figure 1, and showing one of the supports pivoted inwardly to its supporting position;

Figure 9 is an enlarged, fragmentary vertical sectional view taken substantially on the plane of section line 9—9 of Figure 1 and showing one of the supports pivoted inwardly and the supporting arm associated therewith in a raised position;

Figure 13 is a fragmentary vertical sectional view taken substantially on the plane of section line 13—13 of Figure 9;

Figure 14 is an end view of the present invention taken from the opposite end thereof than Figure 6;

Figure 15 is a diagrammatic view showing the hydraulic system used in conjunction with the present invention;

Figure 16 is a fragmentary side elevational view of the present invention in slightly modified construction with the cylinders at the front of the supports; and, Figure 17 is a fragmentary top plan view taken substantially in the direction of arrow numbered 17 in Figure 16.

Figure 1:
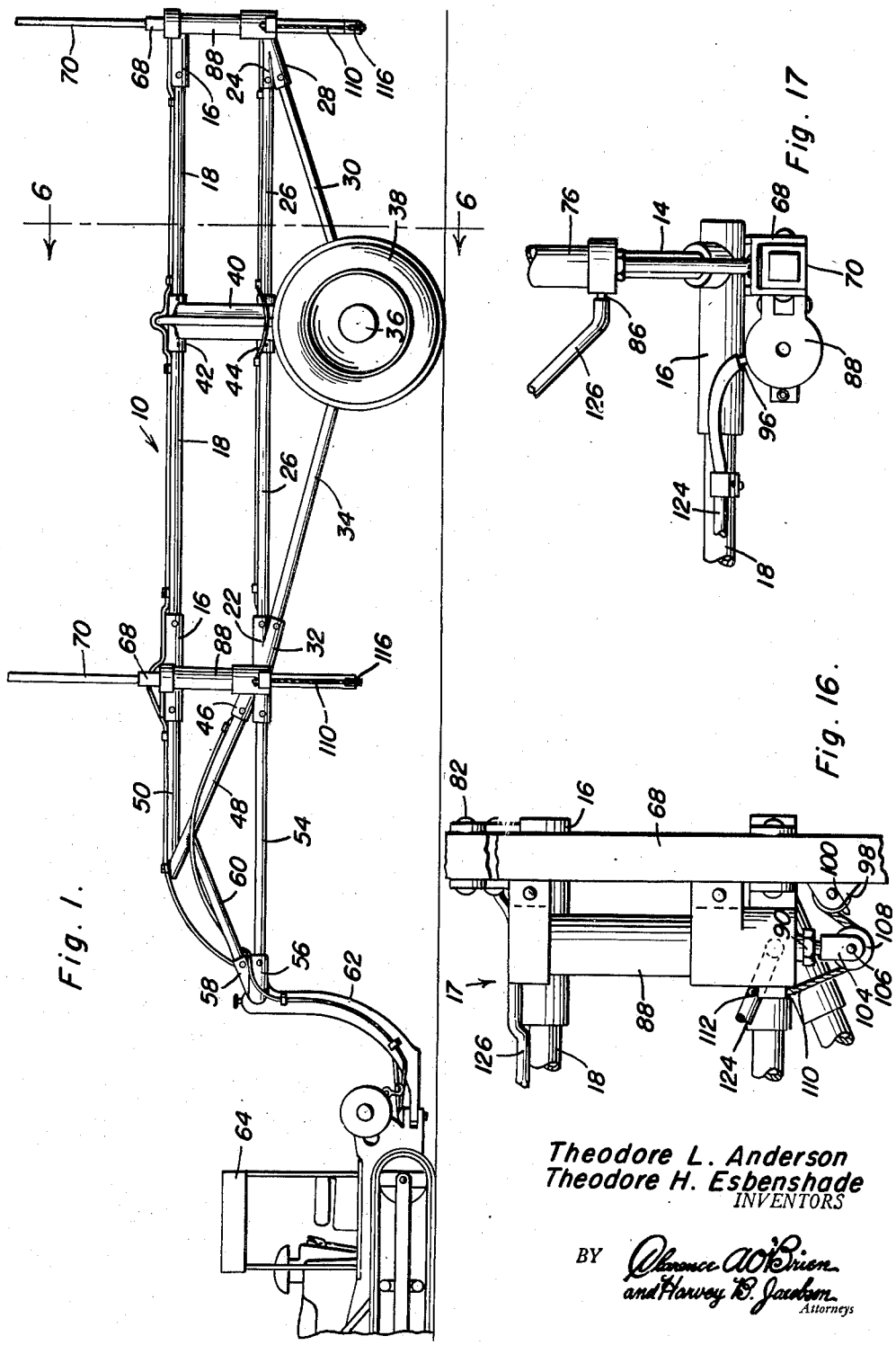
Figure 1 is a side elevational view of the present invention and showing the same applied to a tractor.
Figure 2:
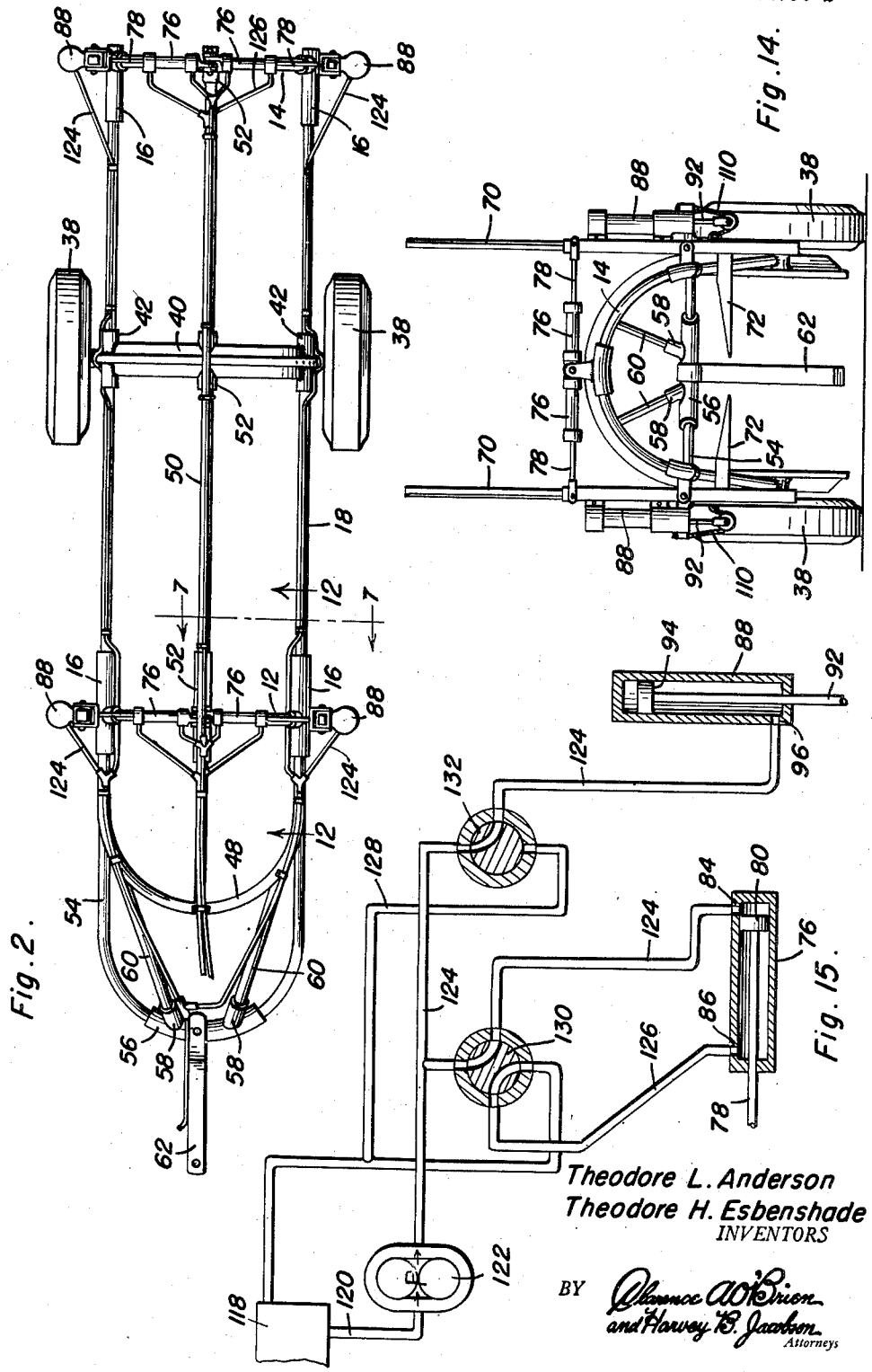
Figure 2 is a top plan view of the present log carrier.

Referring now to the drawings in detail, wherein for the purpose of illustration, there is disclosed a preferred embodiment of the present invention. the numeral 10 represents the present wheeled frame or log carrier generally, including forward and rear tubular, substantially U-shaped end members 12 and 14.

Fixed to the leg portions of each of the end members 12 and 14, in any suitable manner, are upper tubular, substantially horizontal sleeves 16 that receive upper rails 18 forming a connection between the ends members 12 and 14. The rails 18 are detachably secured to the sleeves 16 by removable pins or the like 20 that extend through the sleeves 16 and the said rails.

Lower sleeves 22 and 24 are secured to the legs of the members 12 and 14 and detachably support lower tubular members or rails 26 that form a further connection between the end members 12 and 14.

The sleeves 24 carried by the rear end member 14 are provided with forwardly and downwardly inclined sockets 28 that receive and which are removably secured to rear axle supporting tubes 30, and the sleeves 22 carried by the forward end member 12 are provided with downwardly and rearwardly inclined sockets 32 in which the forward terminals of a forward pair of axle supporting tubes 34 are detachably supported.

The tubes 34 and tubes 30 converge and are secured to stub axles 36 supporting a pair of preferably pneumatic wheels 38, and the axles 36 are further supported by a U-shaped main frame member 40 that supports upper and lower sleeves 42 and 44 in which the rails 18 and 26 are mounted.

The forward sleeves 22 are integrally formed with upwardly and forwardly inclined sockets 46 in which the end portions of a vertical inclined, U-shaped end frame member 48 is secured to a central sectional tubular beam 50 that extends longitudinally between the end members 12 and 14.

The beam 50 is also supported in further sleeves 52 fixed to the webs of the end members 12 and 14 and the frame member 40.

A substantially U-shaped horizontally disposed, tubular frame member 54 is disposed forwardly of the end member 12 and the legs thereof are detachably mounted in the sleeves 22. The web portion of this latest frame member 54 is reinforced by an outer sleeve 56 having a pair of upwardly and rearwardly inclined sockets 58 that receive inclined brace arms 60 which are fixed to the frame member 48.

A suitable tongue or drawbar 62 is carried by the outer sleeve 56 for detachable engagement with a towing vehicle, such as a tractor 64.

Pivotally secured to ears 66 projecting outwardly from the leg portions of each of the end members 12 and 14 are substantially rectangular supports or tubes 68 that slidably receive shanks or shafts 70 the lower ends of which support laterally extending log supporting arms or teeth 72.

The supports 68 are provided with longitudinal slots 74 in the lower ends thereof in which the arms 72 are slidably received when the same are raised, as shown in Figure 9.

Pivotally secured to the web portions of each of the end members 12 and 14, are the inner ends of a pair of cylinders 76 the outer ends of which slidably receive piston rods 78 that are coupled to pistons 80 workable in the cylinders 76. The outer ends of the piston rods 78 are pivoted at 82 to the upper ends of the supports 68, and the cylinders 76 are each provided with entrance ports 84 and 86.

Further cylinders 88 are mounted on the supports 68 and are provided with guides 90 at their lower ends that slidably receive piston rods 92 which are secured to pistons 94 movable longitudinal within the said cylinders 88. The upper ends of the cylinders 88 are provided with ports 96 for a purpose which will later be more fully apparent.

Rotatably supported between pairs of ears 98 projecting laterally from each of the supports 68, are rollers 100 that are partially positioned in openings 102 provided in the supports 68 intermediate the ends thereof.

The lower terminals of the piston rods 92 project outwardly from the lower ends of the cylinders 88 and support U-shaped brackets 104 holding shafts 106 on which rollers 108 are journaled for rotation.

One end of a rope or flexible element 110 is anchored as at 112 to each of the cylinders 88, and the rope 110 is trained under the roller 108, over the roller 100, through the opening 102, downwardly through a longitudinal recess or channel 114 in the outer face of the shank 70, and the free end of the rope 110 is then anchored as at 116 to the lower end of the shank 70. It is noted, that there is provided a flexible element 110 for each of the cylinders 88 and shanks 70.

Connected to a source of fluid 118 by a conduit or pipe 120, is a suitable pump 122 having an outlet conduit 124 that is connected to the ports 84 of the cylinders 76 and the ports 96 of the cylinders 88.

Further conduits 126 extend from the ports 86 of the cylinders 76 and lead to the source 118, and the conduit 124 leading from the ports 96 of the cylinders 88 are provided with return conduits 128 that communicate with the conduit or conduits 126.

A valve or valves 130 control the supply and return of fluid from the cylinders 76, and a further valve or valves 132 control the supply and return of fluid through the conduit 124 to the cylinders 88.

In practical use of the present invention, the supports 68 are normally disposed in a substantially vertical position and the shanks 70 are raised with the arms 72 positioned in the slots 74, as shown best in Figures 1, 6, 9 and 14 of the drawings.

Figure 3:
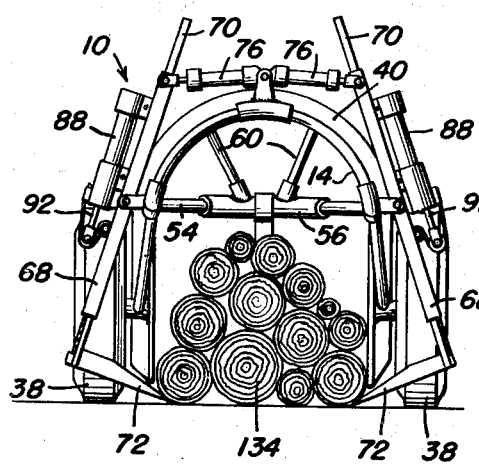
Figure 3 is a rear elevational view of the present log carrier and showing the supports pivoted outwardly and the supporting arm in a lowered position for engaging a pile of logs.
Figure 7:
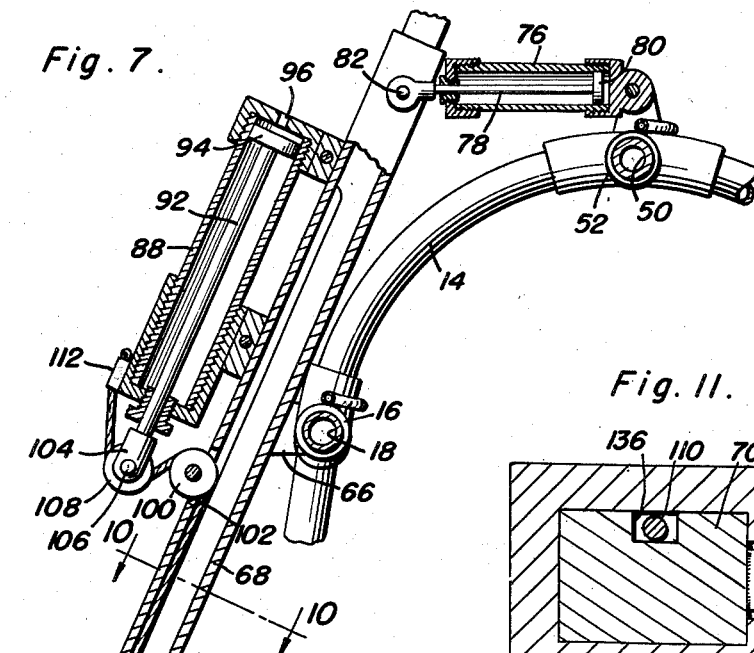
Figure 7 is an enlarged fragmentary vertical sectional view taken substantially on the plane of section line 7—7 of Figure 1 and showing the manner in which the log supporting arms are raised and the supports pivotally adjusted.

The wheeled frame 10 is then moved, by the tractor 64 so that the end members 12 and 14 saddle a pile or group of logs 134 whereupon the valve 130 is rotated so that a fluid will enter the ports 86 of the cylinders 76 to move the piston rods 78 inwardly and thereby pivot the lower ends of the supports 68 outwardly. The valve 132 is then rotated so that fluid will pass outwardly through ports 96 permitting the piston rods 92 to move upwardly as the shanks 70 and arms 72 move downwardly (see Figures 3 and 7).

Figure 4:
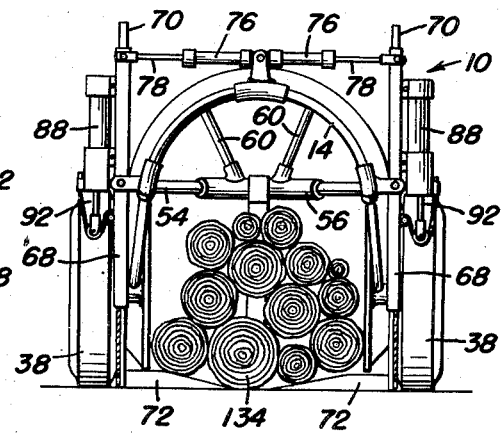
Figure 4 is a rear elevational view of the present log carrier and showing the supports pivoted inwardly and the supporting arms in a lowered position for supporting the logs.

The valve 130 is then rotated to permit the pistons 78 to move outwardly and swing the lower ends of the supports 68 and the arms 72 inwardly and under the pile of logs 134 (see Figure 4).

Figure 5:
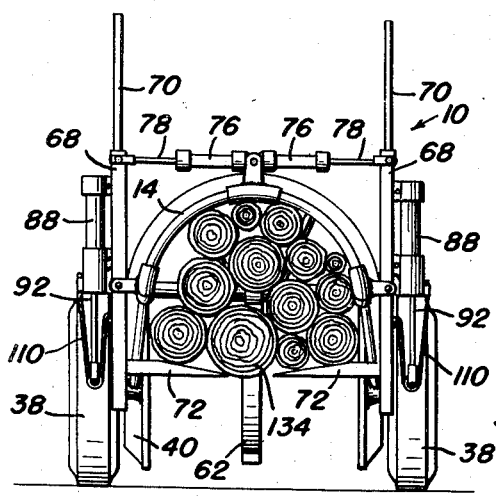
Figure 5 is a view similar to Figure 4, and showing the supporting arms in a raised position.
Figure 6:
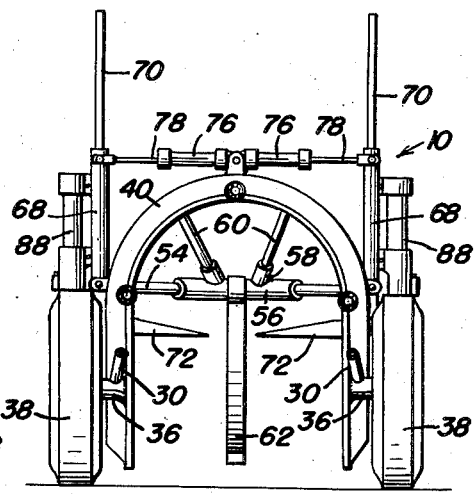
Figure 6 is a transverse vertical sectional view taken substantially on the plane of section line 6—6 of Figure 1.

Next, the valve 132 is rotated so that the fluid will enter the ports 96 to force the piston rods 92 downwardly and raise the shanks 70, the arms 72 and the logs 134 supported on the arms 72 (see Figure 5), until the logs bear against the end members 12 and 14.

It is preferred that the supports 68 and the shanks 70 at the forward end of the wheeled frame 10 operate independently of the supports 68 and shanks 70 at the rear end of the wheeled frame 10, however, the same could function simultaneously without departing from the scope of the present invention.

Figure 11:
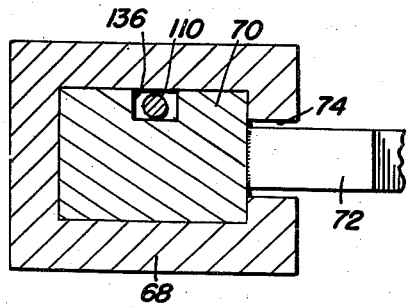
Figure 11 is a view similar to Figure 10 and showing an alternate connection between the lifting cable and arm supporting shank.
Figure 10:
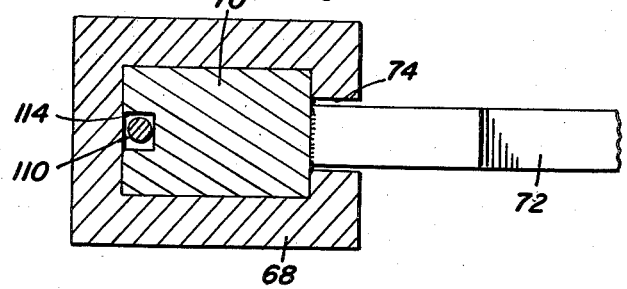
Figure 10 is an enlarged transverse sectional view taken substantially on the plane of section line 10—10 of Figure 7.
Figure 12:
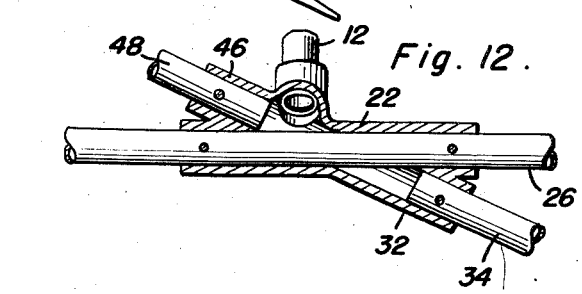
Figure 12 is an enlarged fragmentary longitudinal vertical sectional view taken substantially on the plane of section line 12—12 of Figure 2.

Reference is now directed to Figures 11, 16 and 17, wherein there is disclosed an alternate arrangement for the pump cylinders 88 which are secured to either the forward faces or rear faces of the support 68 instead of the outer faces of the said supports 68, to reduce the overall width of the wheeled frame.

When the pump cylinders 88 are arranged as illustrated in Figures 16 and 17, the shanks 70 are provided with longitudinal grooves or recesses 136 in either their forward faces or rear faces instead of the outer faces, and the openings 102 are provided in either the forward or rear faces of the supports 68.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A log carrier comprising a wheeled frame including forward and rear U-shaped end members and longitudinal side rails joining the end members, a pair of pivotal supports carried by the end members, a pair of cylinders mounted on each of the end members, pistons movable longitudinally in said cylinders, piston rods carried by the pistons and pivoted to the supports, hydraulically operated means actuating said pistons on said forward end member for moving said supports on said forward end member, additional hydraulically operated means actuating said pistons on said rear end member for moving the supports on the rear end member independently of the supports on the forward end member, said supports including tubular members, log supporting arms disposed transversely of said tubular member and including shanks slidably received by said tubular members, and means supported solely by the supports for selectively adjusting the shanks relative to the tubular members.

2. The combination of claim 1 wherein said last mentioned means includes a reciprocable member associated with each of said shanks, a flexible element connecting each of said shanks to said frame, said reciprocable members engaging said elements for moving the shanks, and hydraulically operated means for actuating said reciprocable members.

3. A log carrier comprising a wheeled frame including a pair of inverted U-shaped end members adapted to receive logs, a plurality of longitudinal side rails joining the end members, a tubular support pivoted to each of the leg portions of said end members for vertical swinging movement, shanks slidably received in said supports, supporting arms fixed to said shanks, hydraulically operated means for raising said shanks, and means for swinging said supports and retaining said supports in a selected pivoted position, said last-mentioned means including a piston cylinder carried by each support, a piston rod slidably mounted in each cylinder, and flexible elements attached to said shanks and tensioned by said pistons for raising the shanks.

4. A log carrier comprising a frame including cradle-forming members, wheels on the frame and disposed exteriorly of the cradle-forming members to permit the frame to be moved over a pile of logs for the lifting of a pile of logs into a cradle formed by said members, a pair of vertically swinging supports mounted on said frame and movable toward and away from each other, means operatively connected to said supports for adjusting the supports relative to each other, shanks slidably carried by said supports, arms mounted on said shanks for engaging under a pile of logs underlying the cradle-forming members, sliding rods carried by said supports, flexible elements terminally attached to said frame and said shanks and underlying said rods, and means for imparting a sliding movement to said rods, said rods engaging the flexible elements to raise the shanks and lift a pile of logs into a cradle formed by said members.

5. A log carrier comprising a frame including cradle-forming members, wheels on the frame and disposed exteriorly of the cradle-forming members to permit the frame to be moved over a pile of logs for the lifting of a pile of logs into a cradle formed by said members, a pair of vertically swinging supports mounted on said frame, means operatively connected to said supports for adjusting the supports relative to each other, shanks slidably carried by said supports, arms mounted on said shanks for engaging under a pile of logs underlying the cradle-forming members, sliding rods carried by said supports, flexible elements terminally attached to said frame and said shanks and underlying said rods, and means for imparting a sliding movement to said rods, said rods engaging the flexible elements to raise the shanks and lift a pile of logs into a cradle formed by said members, rollers on said rods engaging the flexible elements, and means connected to the rods for moving the rollers against the flexible elements to raise the shanks.

6. A log carrier comprising a wheeled frame, a pair of vertically swinging supports pivoted to the frame, means mounted on the frame and connected to the supports for swinging the supports, shanks slidably carried by the supports, arms at the lower ends of said shanks and underlying the frame, cylinders supported solely by said supports, piston rods slidably carried by the cylinders and having lower ends, rollers supported on the lower ends of said rods, additional rollers on said supports, flexible elements having lower ends attached to said shanks and upper ends attached to said cylinders, said flexible elements being trained over said additional rollers and beneath the first-named rollers, and means associated with the cylinders for moving the rollers against the flexible elements to raise the shanks.

7. A log carrier comprising a wheeled frame, a pair of vertically swinging supports pivoted to the frame, means mounted on the frame and connected to the supports for swinging the supports, shanks slidably carried by the supports, arms at the lower ends of said shanks and underlying the frame, cylinders supported solely by said supports, piston rods slidably carried by the cylinders and having lower ends, rollers supported on the lower ends of said rods, additional rollers on said supports, flexible elements having lower ends attached to said shanks and upper ends attached to said cylinders, said flexible elements being trained over said additional rollers and beneath the first-named rollers, and means associated with the cylinders for moving the rollers against the flexible elements to raise the shanks, said supports being hollow to receive said shanks, said shanks having longitudinal grooves receiving the flexible elements, said flexible elements extending into the supports, said supports also having openings above said additional rollers through which said flexible elements pass from the supports.

THEODORE L. ANDERSON.
THEODORE H. ESBENSHADE.

REFERENCES CITED

The following references are of record in the file of this patent:

UNITED STATES PATENTS

| Number | Name | Date |
|---|---|---|
| 1,289,529 | Overlin | Dec. 31, 1918 |
| 1,307,009 | Joy | June 17, 1919 |
| 1,609,018 | Gerlinger | Nov. 30, 1926 |
| 1,734,330 | Grab | Nov. 5, 1929 |
| 1,777,019 | Samuelsson | Sept. 30, 1930 |
| 2,161,734 | Wheless | June 6, 1939 |
| 2,259,558 | Evans | Oct. 21, 1941 |
| 2,404,898 | Aycock | July 30, 1946 |
| 2,410,965 | Dimick | Nov. 12, 1946 |
| 2,438,534 | Bowers | Mar. 30, 1948 |
| 2,443,317 | Lancaster | June 15, 1948 |
| 2,488,767 | Drott et al. | Nov. 22, 1949 |

FOREIGN PATENTS

| Number | Country | Date |
|---|---|---|
| 25,954 | Great Britain | Nov. 13, 1902 |